(12) United States Patent (10) Patent No.: US 8,757,713 B2
Reinhardt (45) Date of Patent: Jun. 24, 2014

(54) MULTI-CONFIGURATION MOTORCYCLE TOUR-PACK AND BACKREST

(71) Applicant: Tomorrow Designs and Innovations Today, LLC., Cloverdale, CA (US)

(72) Inventor: David Reinhardt, Cloverdale, CA (US)

(73) Assignee: Think About It Designs, Cloverdale, CA (US)

( * ) Notice: Subject to any disclaimer, the term of this patent is extended or adjusted under 35 U.S.C. 154(b) by 55 days.

(21) Appl. No.: 13/687,997

(22) Filed: Nov. 28, 2012

(65) Prior Publication Data

US 2013/0134747 A1 May 30, 2013

Related U.S. Application Data

(60) Provisional application No. 61/564,273, filed on Nov. 28, 2011.

(51) Int. Cl.
*B62J 1/00* (2006.01)

(52) U.S. Cl.
CPC ... *B26J 1/28* (2013.01); *B26J 9/001* (2013.01)
USPC ...................................... 297/215.12; 180/219

(58) Field of Classification Search
USPC ..................................................... 297/215.12
See application file for complete search history.

(56) References Cited

U.S. PATENT DOCUMENTS

| | | | |
|---|---|---|---|
| 1,367,981 A * | 2/1921 | Lawrence | 297/373 |
| 3,698,762 A * | 10/1972 | Gorman | 297/215.12 |
| 3,822,917 A * | 7/1974 | George | 297/215.12 |
| 4,466,660 A | 8/1984 | Mabie | |
| 4,549,629 A * | 10/1985 | Komuro | 180/219 |
| 4,776,632 A * | 10/1988 | Akimori et al. | 297/284.9 |
| 6,007,150 A | 12/1999 | Clerkin | |
| 6,491,124 B1 | 12/2002 | Thompson | |
| 6,659,547 B2 * | 12/2003 | Petersen | 297/215.1 |
| 7,070,234 B1 | 7/2006 | Pravettone | |
| 2003/0075372 A1 * | 4/2003 | Kurohori et al. | 180/219 |

FOREIGN PATENT DOCUMENTS

JP     02249783 A * 10/1990 ............. B62K 15/00

* cited by examiner

*Primary Examiner* — David E Allred
(74) *Attorney, Agent, or Firm* — Temmerman Law Office; Mathew J. Temmerman (57) ABSTRACT

A multi-configurable tour-pack and backrest assembly for a motorcycle is presented. The multi-configurable tour-pack and backrest assembly is adaptable to provide backrest support to a driver and at least one passenger. The multi-configurable tour-pack and backrest assembly comprises a frame structure, a slide deck housing, a left side pivoting means, a right side pivoting means, a left sliding mechanism, a right sliding mechanism and a control interface. The slide deck housing is mounted with a slide deck rail, a tour-pack and a backrest. The backrest and the tour-pack are designed to move along the slide deck rail to achieve a plurality of seating configurations such as a passenger supporting configuration and a driver supporting configuration. The control interface allows the multi-configurable tour-pack and backrest assembly to move between the passenger supporting configuration and the driver supporting configuration to provide the backrest support to the driver and the passenger.

34 Claims, 10 Drawing Sheets

MULTI-CONFIGURATION MOTORCYCLE TOUR-PACK AND BACKREST

RELATED APPLICATIONS

This application claims priority from the U.S. provisional application with Ser. No. 61/564,273, which was filed on Nov. 28, 2011. The disclosure of that provisional application is incorporated herein as if set out in full

BACKGROUND OF THE DISCLOSURE

1. Technical Field of the Disclosure

The present invention relates in general to motorcycle seating, and more specifically, the present invention provides a multi-configurable tour-pack and backrest assembly for a motorcycle adaptable to provide backrest support to a driver and at least one passenger.

2. Description of the Related Art

Motorcycling is a popular leisure activity, as well as a practical means of transportation. Moreover, with fuel prices rising, the popularity of motorcycling seems to be continually increasing. Motorcycle riders may commonly ride for a period of several hours, and may ride for several days on end during travel trips. Additionally, many motorcycles, and large touring motorcycles in particular, are capable of accommodating a passenger in addition to the driver. Indeed, many motorcycle owners spend long periods of time riding both solo, and with a passenger.

These facts make designing motorcycle seats challenging because it is difficult to design a single seat, which will be supportive and comfortable for both use by a driver alone and by a driver and a passenger. In particular, many touring motorcycles incorporate a passenger backrest with a tour-pack mounted above a rear wheel of the motorcycle. This combined backrest and tour-pack offers many advantages but suffers from the disadvantage of not supporting the driver when he or she is riding alone. The lack of back support can lead to back fatigue and pain for a solo motorcycle rider.

Over the years, a variety of movable or adjustable back support designs have been developed. For example, U.S. Pat. No. 4,466,660 issued to Mabie on Aug. 21, 1984 describes a backrest assembly having a backrest with a suitable cushion, and backrest legs. The backrest cushion is tiltable for comfort and the backrest legs are telescopably adjustable to raise or lower the cushion.

U.S. Pat. No. 6,007,150 issued to Clerkin on Dec. 28, 1999 describes a motorcycle seat having a backrest that is angularly adjustable, height adjustable and removable. The backrest is mounted by a bracket to a pivot bracket carried by a frame of a backrest adjustment assembly all of which are disposed below the surface of the seat cushion. The assembly has a prime mover coupled to the frame and pivot bracket and communicates by cable with an actuator allowing selective angular backrest adjustment.

Another type of backrest adjusting system is described in U.S. Pat. No. 6,491,124 as issued to Thompson on Dec. 10, 2002, and which provides a seating system configurable between a one-person and a two-person configuration. The seating system described therein comprises a bed with front and rear portions, a bench with front and rear portions, and a backrest. The backrest is moveable between a first position immediately aft of the front bench portion whereby the seating system is in the one-person configuration, and a second position immediately aft of the rear bench portion whereby the seating system is in the two-person configuration.

In U.S. Pat. No. 7,070,234 issued to Pravettone on Jul. 4, 2006, a motorcycle backrest adjusting system is described. The backrest adjusting system comprises a seat and a pair of support bars that extend rearward from the seat. A pair of lower brackets is provided and each of the lower brackets is attached to one of the support bars. A pair of upper brackets is provided and each of the upper brackets is moveably coupled to one of the lower brackets.

All of the abovementioned backrest adjusting systems suffer from considerable drawbacks. Such systems are not adjustable between a driver supporting position and a passenger supporting position wherein each position is further adjustable. Further, such systems require the use of tools for dismounting the motorcycle while installing the backrest adjusting systems in the motorcycle. Moreover, such systems require the user to remove and remount the motorcycle to adjust the backrest. Such systems cannot be installed without modifying the motorcycle or drilling additional holes in the motorcycle.

Therefore, there is a need for a backrest adjusting system that can be implemented in a motorcycle. Such a system would provide backrest support to a driver and a passenger. Further, the needed system would be adjustable while both the driver and the passenger are on the motorcycle. Moreover, the needed system would be adjustable without the use of tools, levers, or other manual techniques. Such a needed system would provide comfortable seating configurations to the driver and the passenger. Such a system would be installed without modifying the motorcycle or drilling additional holes in the motorcycle. Further, such a system would provide configurations to allow a driver and passenger to more easily mount and dismount the motorcycle.

SUMMARY OF THE DISCLOSURE

To minimize the limitations found in the prior art, and to minimize other limitations that will be apparent upon the reading of the specification, the preferred embodiment of the present invention provides a multi-configurable tour-pack and backrest assembly for a motorcycle. The multi-configurable tour-pack and backrest assembly is adaptable to provide backrest support to a driver and at least one passenger. The multi-configurable tour-pack and backrest assembly comprises a frame structure having a left frame portion and a right frame portion. The frame structure is mounted with a slide deck housing. The slide deck housing includes a left slide deck portion and a right slide deck portion. The tour-pack and backrest assembly further comprises a slide deck rail mounted on the slide deck housing. The backrest and the tour-pack are designed to move along the slide deck rail in a forward direction and in a backward direction to achieve a plurality of comfortable seating configurations. The plurality of comfortable seating configurations includes a passenger supporting configuration and a driver supporting configuration. In the passenger supporting seating configuration, at least one passenger and a driver can be comfortably seated on the motorcycle and the configuration provides the backrest support for the passenger's use. In the driver supporting configuration, the driver is comfortably seated on the motorcycle and the configuration provides the backrest support for the driver's use. Each of the plurality of comfortable seating configurations is further adjustable to accommodate drivers and passengers of varying sizes.

The tour-pack and backrest assembly further comprises a control interface that allows the multi-configurable tour-pack and backrest assembly to achieve the plurality of comfortable seating configurations. In the preferred embodiment, the control interface is located at one of the handles of the motorcycle so that the driver can easily control the movement of the slide deck housing, tour-pack and the backrest. The control interface allows the multi-configurable tour-pack and backrest assembly to move between the passenger supporting configuration and the driver-supporting configuration. The multi-configurable tour-pack and backrest assembly further comprises a left side pivoting means, a right side pivoting means, a left sliding mechanism and a right sliding mechanism. A slide deck motor is attached to the slide deck housing to adjust the movement of the backrest and the tour-pack in the forward and in the backward direction along the slide deck rail. The left slide deck portion is pivotally connected to the left side pivoting means. Preferably, the left side pivoting means includes a left side front pivoting arm and a left side rear pivoting arm. The right slide deck portion is pivotally connected to the right side pivoting means. The right side pivoting means includes a right side front pivoting arm and a right side rear pivoting arm. The left sliding mechanism is connected to the left frame portion and the right sliding mechanism is connected to the right frame portion. The left sliding mechanism includes a left pivoting motor and a left pivoting gear. The left pivoting gear is pivotally connected to the left side rear pivoting arm and mechanically coupled to the left pivoting motor. The left pivoting motor is adaptable to drive the left pivoting gear to pivotally move the left side front pivoting arm and the left side rear pivoting arm. The pivotal movement of the left side front pivoting arm and the left side rear pivoting arm moves the slide deck housing, the tour-pack and the backrest in the forward direction and in the backward direction.

The right sliding mechanism includes a right pivoting motor and a right pivoting gear. The right pivoting gear is pivotally connected to the right side rear pivoting arm and mechanically coupled to the right pivoting motor. The right pivoting motor is adaptable to drive the right pivoting gear to pivotally move the right side front pivoting arm and the right side rear pivoting arm for moving the slide deck housing, the tour-pack and the backrest in the forward direction and in the backward direction. The left sliding mechanism and the right sliding mechanism are actuated by the control interface. The control interface is operatively coupled to the left and right sliding mechanisms and includes a plurality of control switches. At least one of the plurality of control switches is electrically associated with at least one of the plurality of comfortable seating configurations.

The at least one of the plurality of control switches is designed to actuate the slide deck motor and the the left pivoting motor and the right pivoting motor to drive the left pivoting gear and the right pivoting gear respectively. The left pivoting gear pivotally moves the left side front pivoting arm and the left side rear pivoting arm.

Similarly, the right pivoting gear pivotally moves the right side front pivoting arm and the right side rear pivoting arm. The simultaneous movement of the left side arms and the right side arms moves the slide deck housing, the tour-pack and the backrest in the forward and in the backward direction for providing the backrest support to the at least one passenger and to the driver. The tour-pack and the backrest are designed to move relative to the slide deck housing. The driver may actuate the at least one of the plurality of control switches which in turn causes the tour-pack and the backrest assembly to reconfigure to the at least one of the plurality of seating configurations desirable to the driver and the at least one passenger.

It is a first objective of the present invention to provide a multi-configurable tour-pack and backrest assembly that is adjustable between a passenger supporting configuration and a driver supporting configuration.

A second objective of the present invention is to provide a multi-configurable tour-pack and backrest assembly that is adjustable while a driver and at least one passenger are on the motorcycle.

A third objective of the present invention is to provide a multi-configurable tour-pack and backrest assembly that is electrically adjustable without the use of tools, levers, or other manual techniques.

Another objective of the present invention is to provide a multi-configurable tour-pack and backrest assembly that may be installed to a motorcycle without drilling additional holes in the motorcycle and without making any modification in the motorcycle.

Yet another objective of the present invention is to provide a multi-configurable tour-pack and backrest assembly that allows a driver to easily mount and dismount the motorcycle while installing the tour-pack and backrest assembly in the motorcycle.

These and other advantages and features of the present invention are described with specificity so as to make the present invention understandable to one of ordinary skill in the art.

BRIEF DESCRIPTION OF THE DRAWINGS

In order to enhance their clarity and improve understanding of these various elements and embodiments of the invention, elements in the figures have not necessarily been drawn to scale. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. Finally, many of the steps are presented below in an order intended only as an exemplary embodiment. Unless logically required, no step should be assumed to be required earlier in the process than a later step simply because it is written first in this document.

Figure 1:
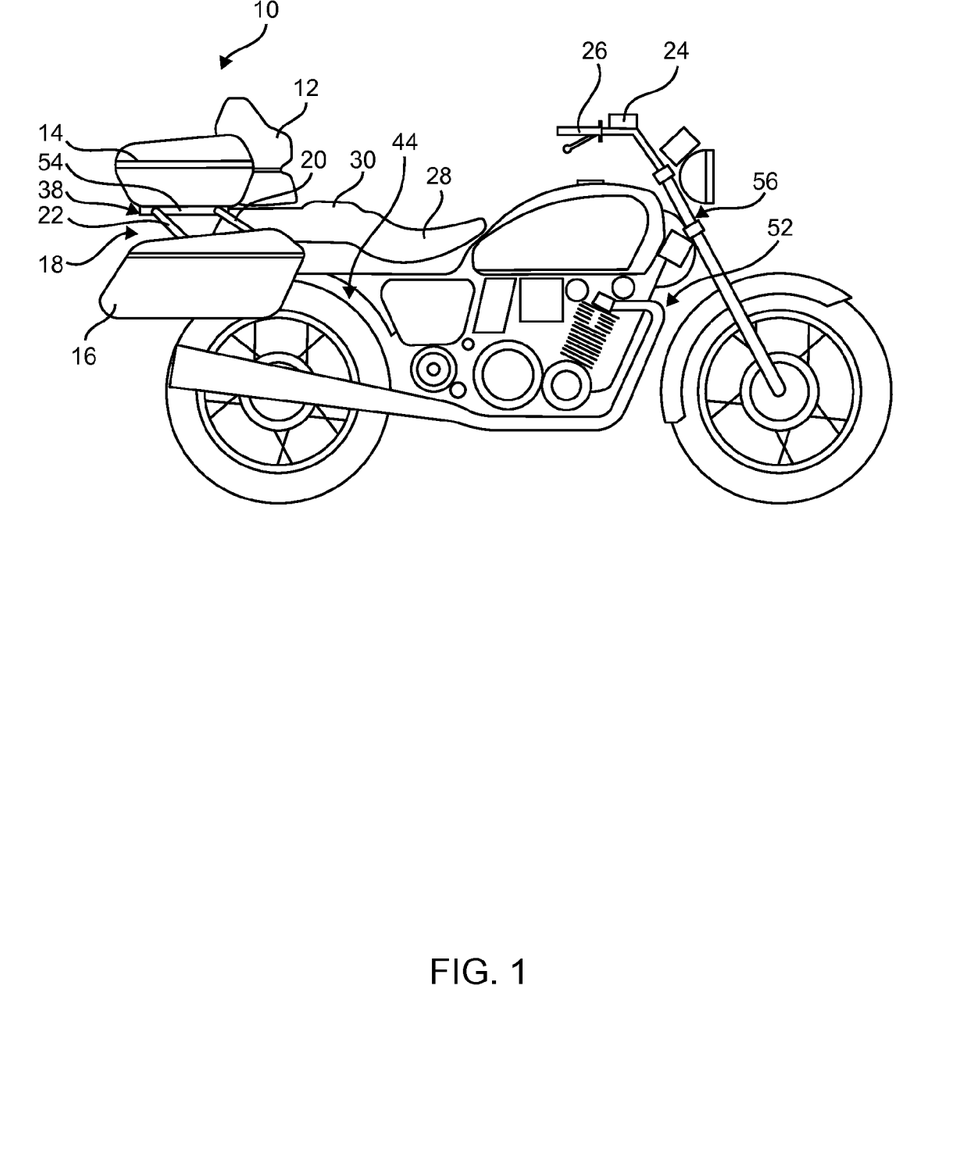
FIG. 1 is a right side view of the present invention, illustrating a multi-configurable tour-pack and backrest assembly for a motorcycle in a passenger supporting configuration.

Referring first to FIG. 1, a side view of a multi-configurable tour-pack and backrest assembly 10 for a motorcycle 56 is illustrated. The multi-configurable tour-pack and backrest assembly 10 is adaptable to provide backrest support to a driver and at least one passenger.

Figure 2:
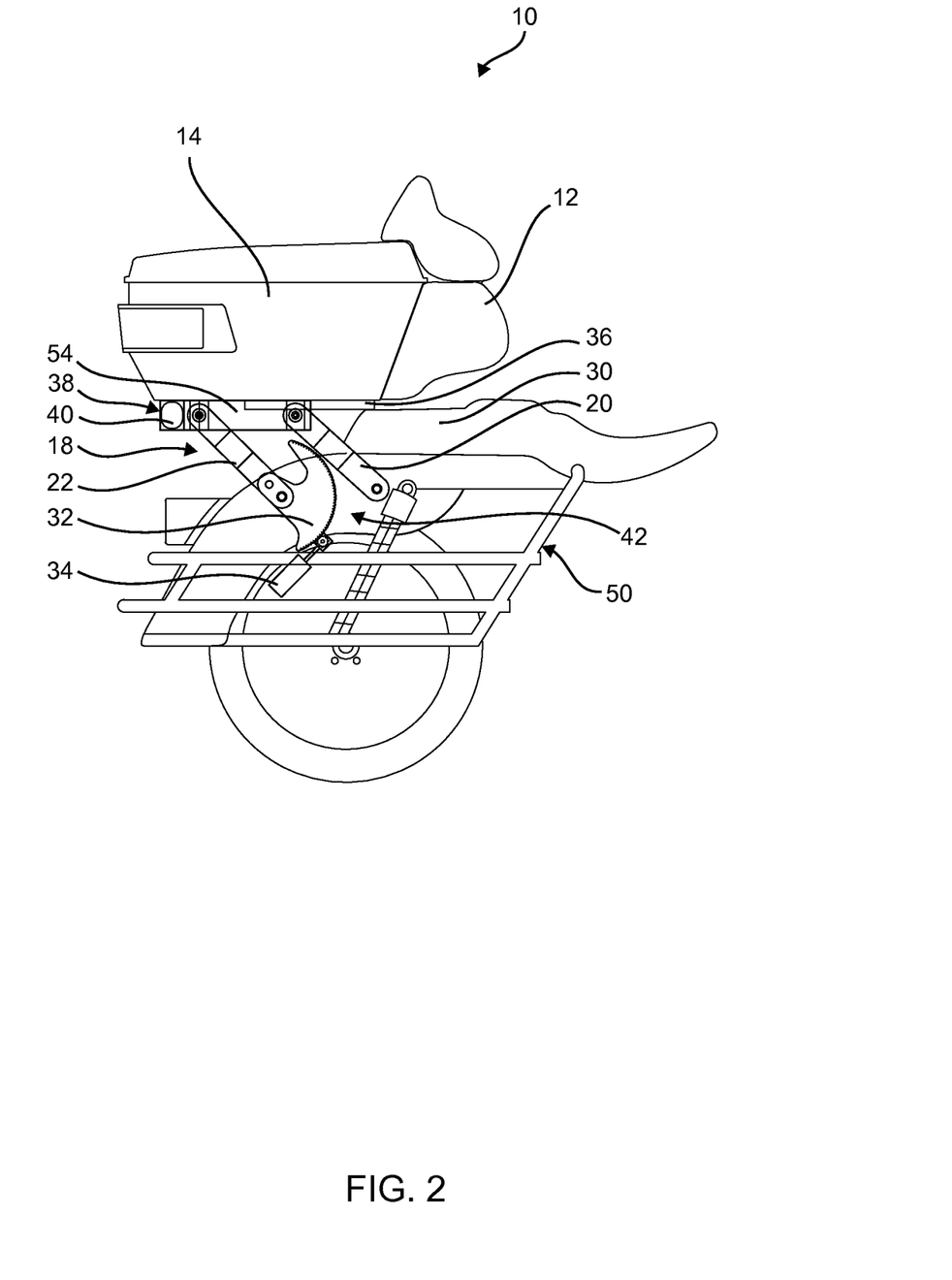
FIG. 2 is a right side view of the present invention, illustrating a backward movement and configuration of a right side pivoting means and a right sliding mechanism of the multi-configurable tour-pack and backrest assembly.
Figure 3:
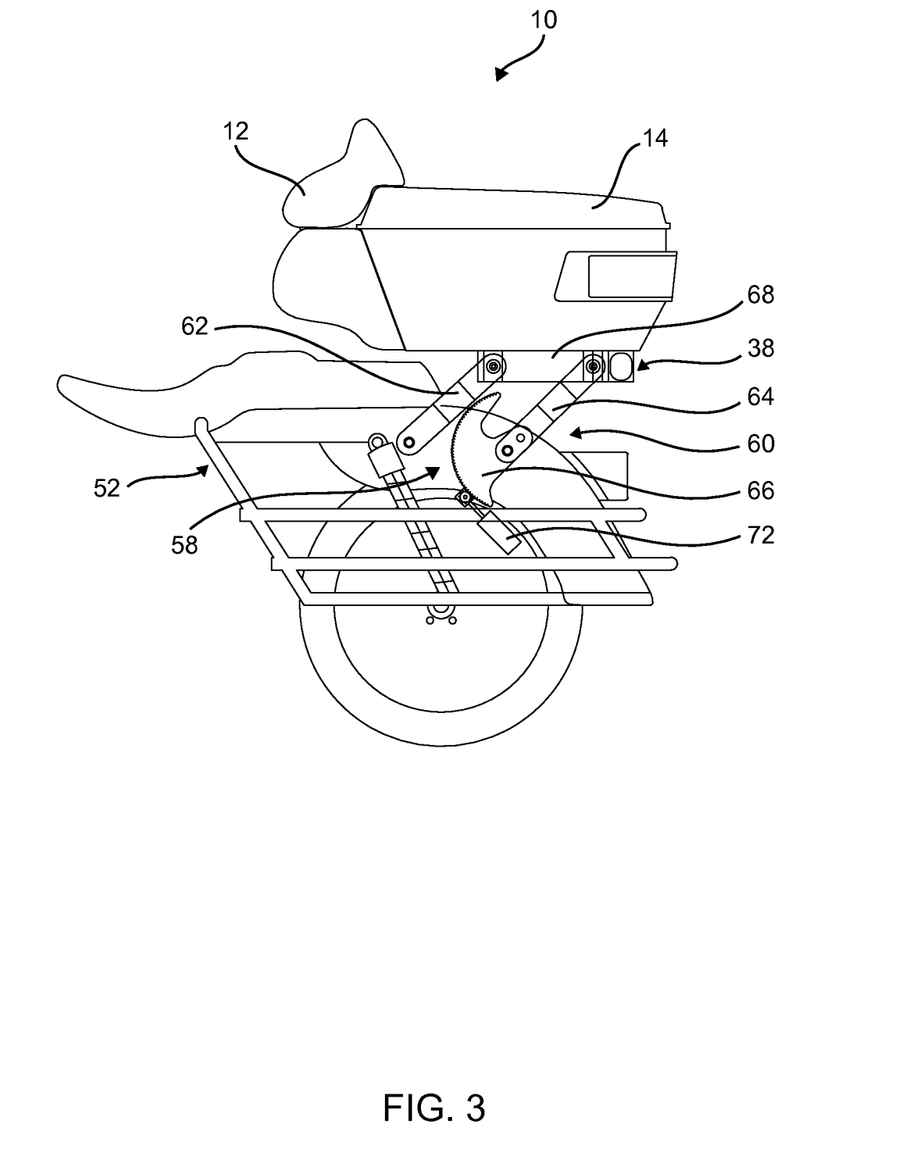
FIG. 3 is a left side view of the present invention, illustrating a backward movement and configuration of a left side pivoting means and a left sliding mechanism of the multi-configurable tour-pack and backrest assembly.

As best illustrated in FIGS. 1 through 9, the multi-configurable tour-pack and backrest assembly 10 generally comprises a frame structure 44. Referring to FIG. 1, the frame structure 44 includes a right frame portion 52 and a left frame portion 50 (see FIG. 3). A slide deck housing 38 is mounted to the frame structure 44. The slide deck housing 38 includes a right slide deck portion 54 and a left slide deck portion 68 (FIG. 3). The tour-pack and backrest assembly 10 further comprises a slide deck rail 36 (FIG. 2) mounted above the slide deck housing 38.

The multi-configurable tour-pack and backrest assembly 10 provides sufficient backrest support for long trip travelers. Hence the tour-pack and backrest assembly 10 may be implemented in touring motorcycles that are commonly used for long trips. Usually, such touring motorcycles are mounted with luggage compartments for storing travel accessories such as clothing, sleeping equipment, rain suits and wireless communication devices of the travelers. This luggage compartment will be referred to herein as a tour-pack 14. In the preferred embodiment, the tour-pack 14 is mounted on the slide deck housing 38. The slide deck housing 38 is further mounted with a backrest 12.

The backrest 12 and the tour-pack 14 are designed to move along the slide deck rail 36 (FIG. 2) in a forward direction and in a backward direction. These forward and backward movements allows the tour-pack and the backrest assembly 10 to achieve a plurality of comfortable seating configurations adaptable to provide the backrest support to the driver and the at least one passenger. The plurality of comfortable seating configurations includes a driver supporting configuration and a passenger supporting configuration. The tour-pack and backrest assembly 10 further comprises a control interface 24 that allows the multi-configurable tour-pack and backrest assembly 10 to achieve the plurality of comfortable seating configurations. In the preferred embodiment, the control interface 24 is located at one of the handles 26 of the motorcycle 56 so that the driver may easily control the movement of the slide deck housing 38, the tour-pack 14 and the backrest 12. In other embodiments of the present invention, the control interface 24 may be positioned at any part of the motorcycle 56 as desired. The control interface 24 allows the multi-configurable tour-pack and backrest assembly 10 to move between the passenger supporting configuration and the driver supporting configuration.

The seating configuration illustrated in FIG. 1 is the passenger supporting configuration as it provides backrest support to the at least one passenger. The slide deck housing 38, the tour-pack 14 and the backrest 12 move in the backward direction to provide the backrest support for the at least one passenger. As shown in FIG. 1, the slide deck housing 38, tour-pack 14 and the backrest 12 moves away from the driver seat 28 and the passenger seat 30 to comfortably position the at least one passenger in the passenger seat 30. In the preferred embodiment, the motorcycle 56 includes a first luggage box 16 and a second luggage box 70 (FIG. 10) for storage purposes.

As is shown in more detail in FIGS. 1-3, a right side pivoting means 18, a left side pivoting means 58, a right sliding mechanism 42 and a left sliding mechanism 60 implemented in the multi-configurable tour-pack and backrest assembly 10 enable the tour-pack 14 and the backrest 12 to move in the forward and backward direction. A slide deck motor 40 is attached to the slide deck housing 38 to adjust the movement of the backrest 12 and the tour-pack 14 in the forward and in the backward direction along the slide deck rail 36. The right slide deck portion 54 is pivotally connected to the right side pivoting means 18. Preferably, the right side pivoting means 18 includes a right side front pivoting arm 20 and a right side rear pivoting arm 22. Similarly, as illustrated in FIG. 3, the left slide deck portion 68 is pivotally connected to the left side pivoting means 58. The left side pivoting means 58 includes a left side front pivoting arm 64 and a left side rear pivoting arm 62. The right sliding mechanism 42 is connected to the right frame portion 52 and the left sliding mechanism 60 is connected to the left frame portion 50.

Referring to FIG. 2, the right sliding mechanism 42 includes a right pivoting motor 34 and a right pivoting gear 32. The right pivoting gear 32 is pivotally connected to the right side rear pivoting arm 22 and mechanically coupled to the right pivoting motor 34. The right pivoting motor 34 is adaptable to drive the right pivoting gear 32 to pivotally move the right side front pivoting arm 20 and the right side rear pivoting arm 22. The pivotal movement of the right side front pivoting arm 20 and the right side rear pivoting arm 22 moves the slide deck housing 38, the tour-pack 14 and the backrest 12 in the forward direction and in the backward direction.

Figure 5:
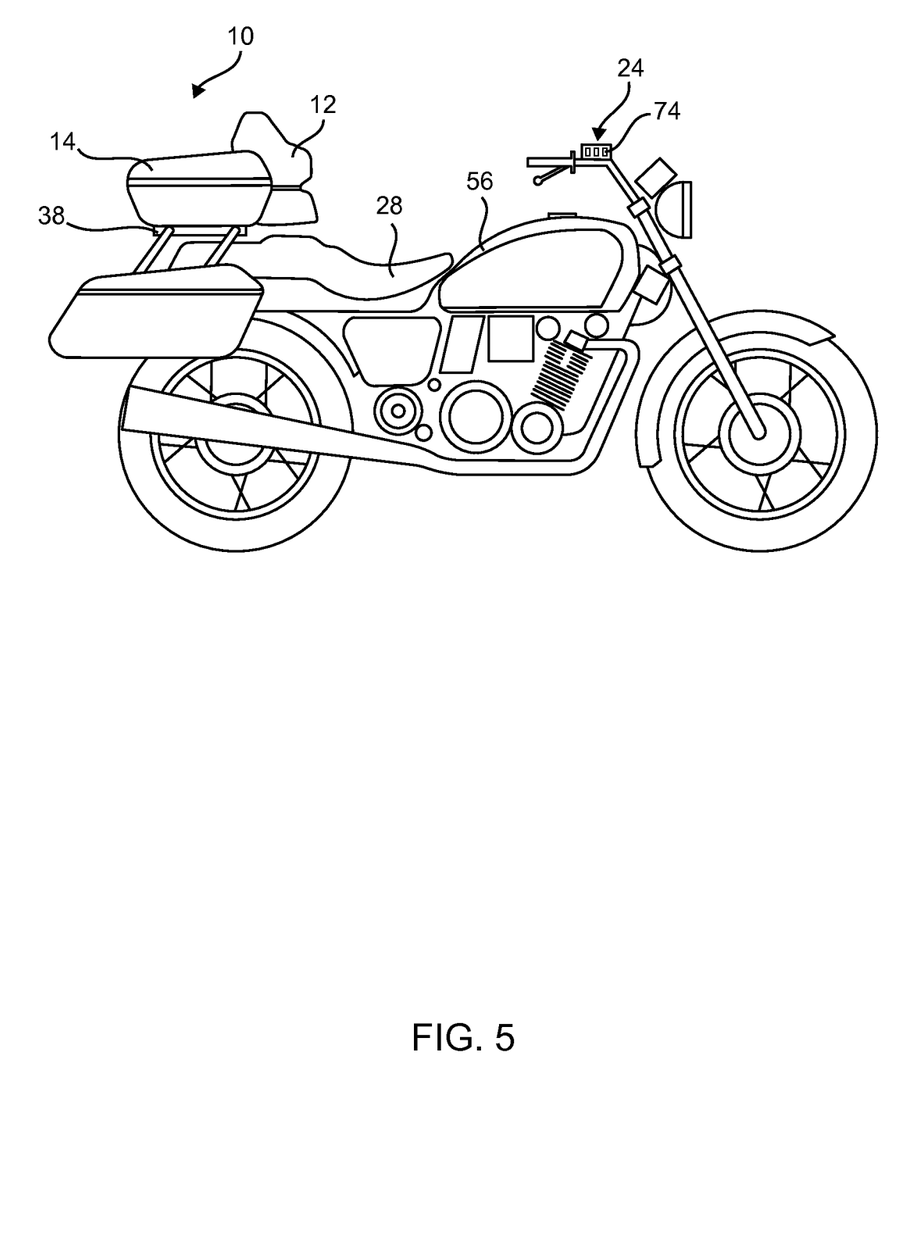
FIG. 5 is a right side view of the present invention, illustrating the forward movement of the multi-configurable tour-pack and backrest assembly to provide the backrest support to a driver having larger size.

Referring to FIG. 3, the left sliding mechanism 60 includes a left pivoting motor 72 and a left pivoting gear 66. The left pivoting gear 66 is pivotally connected to the left side rear pivoting arm 64 and mechanically coupled to the left pivoting motor 72. The left pivoting motor 72 is adaptable to drive the left pivoting gear 66 to pivotally move the left side front pivoting arm 62 and the left side rear pivoting arm 64 for moving the slide deck housing 38, the tour-pack 14 and the backrest 12 in the forward direction and in the backward direction. With reference to FIGS. 2-3, the right side front pivoting arm 20, the right side rear pivoting arm 22, the left side front pivoting arm 62 and the left side rear pivoting arm 64 move in the forward direction to provide the backrest support to the driver. The right sliding mechanism 42 and the left sliding mechanism 60 are actuated by the control interface 24. The control interface 24 is operatively coupled to the right and left sliding mechanisms 42 and 60 and includes a plurality of control switches 74 (FIG. 5). At least one of the plurality of control switches 74 (FIG. 5) is associated with at least one of the plurality of comfortable seating configurations. In the preferred embodiment, the control interface 24 utilizes a plurality of relays and a plurality of wires to attach with the right sliding mechanism 42 and with the left sliding mechanism 60.

The at least one of the plurality of control switches 74 is designed to actuate the slide deck motor 40 and the right pivoting motor 34 and the left pivoting motor 72 to drive the right pivoting gear 32 and the left pivoting gear 66 respectively. The right pivoting gear 32 pivotally moves the right side front pivoting arm 20 and the right side rear pivoting arm 22. Similarly, the left pivoting gear 66 pivotally moves the left side front pivoting arm 62 and the left side rear pivoting arm 64. The simultaneous movement of the right side pivoting arms 20, 22 and the left side pivoting arms 62, 64 moves the slide deck housing 38, the tour-pack 14 and the backrest 12 in the forward and in the backward direction for providing the backrest support to the at least one passenger and the driver. The tour-pack 14 and the backrest 12 are designed to move relative to the slide deck housing 38. The driver has to press the at least one of the plurality of control switches 74 until the tour-pack and the backrest assembly 10 achieves at least one of the plurality of seating configurations desirable to the driver and the at least one passenger. Similar to FIG. 1, the seating configuration illustrated in FIGS. 2-3 provides the backrest support to the at least one passenger. In this configuration, the driver and the at least one passenger can be comfortably seated on the motorcycle 56.

Figure 4:
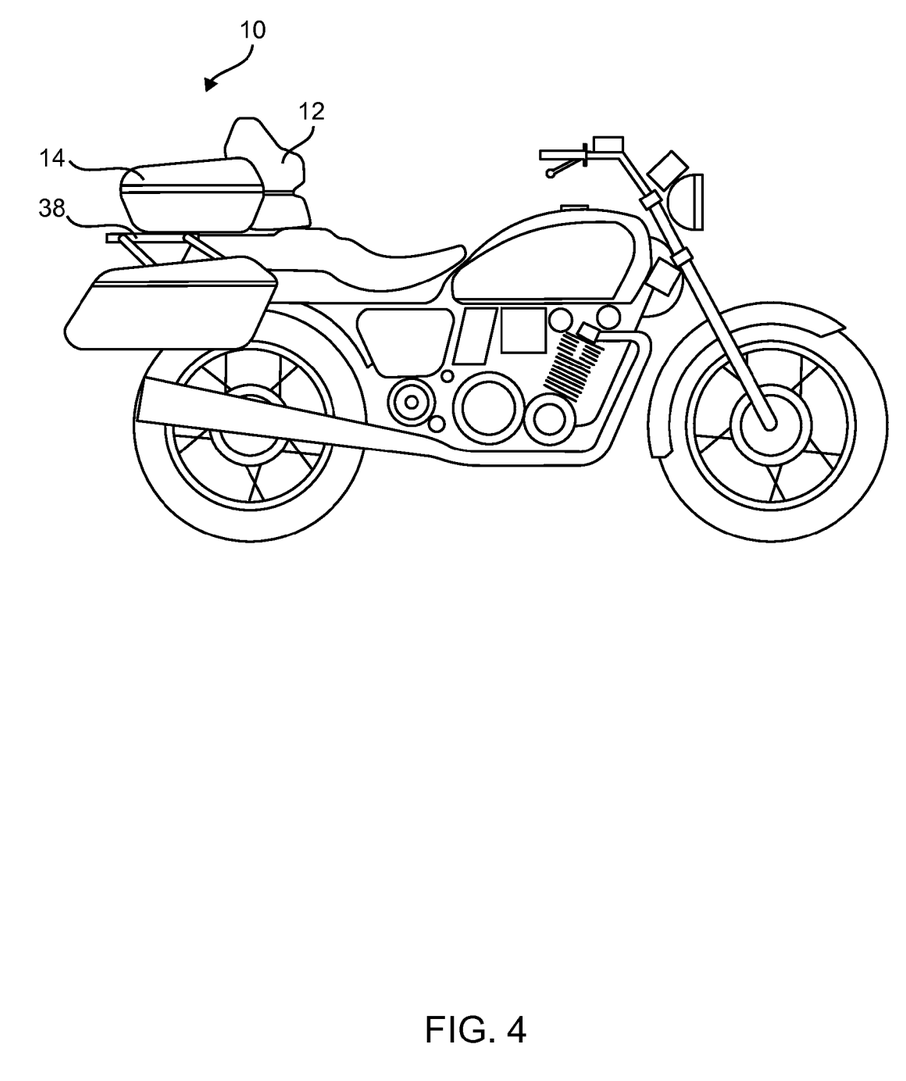
FIG. 4 is a right side view of the present invention, illustrating a forward movement of a tour-pack and a backrest relative to a slide deck housing.

Referring to FIG. 4, the tour-pack 14 and the backrest 12 are in a forward position with respect to the slide deck housing 38. This seating configuration comfortably supports the driver and the at least one passenger in the motorcycle 56 and provides the backrest support to the at least one passenger of a relatively smaller stature or size.

Referring to FIG. 5, the driver supporting configuration adaptable to provide the backrest support to the driver is illustrated. This seating configuration comfortably supports a driver of a larger stature or size. When the driver presses the at least one of the plurality of control interfaces 74, the slide deck housing 38, the tour-pack 14 and the backrest 12 are moved in the forward direction. In this configuration, the spacing between the driver seat 28 and the backrest 12 is smaller than the spacing depicted in FIG. 1 and FIG. 4 as there is no passenger occupied between the driver seat 28 and the backrest 12. In the preferred embodiment, the conversion from the driver supporting configuration to the passenger supporting configuration can be achieved when the driver presses the at least one of the plurality of control switches 74 to activate the right and the left pivoting motors 34 (FIG. 2) and 72 (FIG. 3) for moving the tour-pack 14 and the backrest 12 backward until there is space behind the driver for the at least one passenger to have the backrest support.

Figure 6:
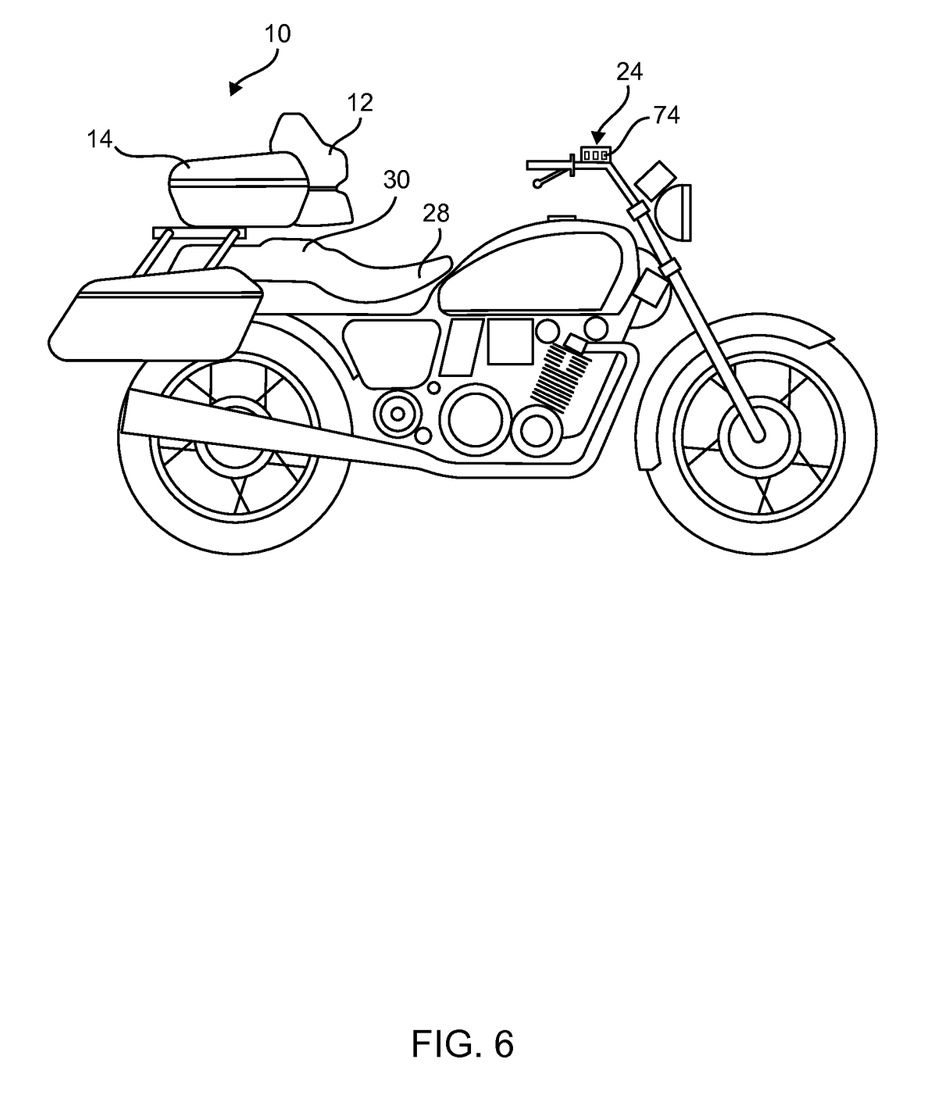
FIG. 6 is a right side view of the present invention, illustrating the forward movement of the multi-configurable tour-pack and backrest assembly to provide the backrest support to a driver having smaller size.

FIG. 6 clearly illustrates the driver supporting configuration adaptable to provide the backrest support to the driver having normal or medium size or stature. When the driver presses the at least one of the plurality of control interfaces 74, the tour-pack 14 and the backrest 12 move in the forward direction relative to the slide deck housing 38. In this seating configuration, the spacing between the driver seat 28 and the backrest 12 is smaller than the spacing depicted in FIG. 5 as the size of the driver is normal. In the preferred embodiment, the slide deck housing 38, the tour-pack 14 and the backrest 12 move in a raised position to provide the proper backrest support to the driver.

Figure 7:
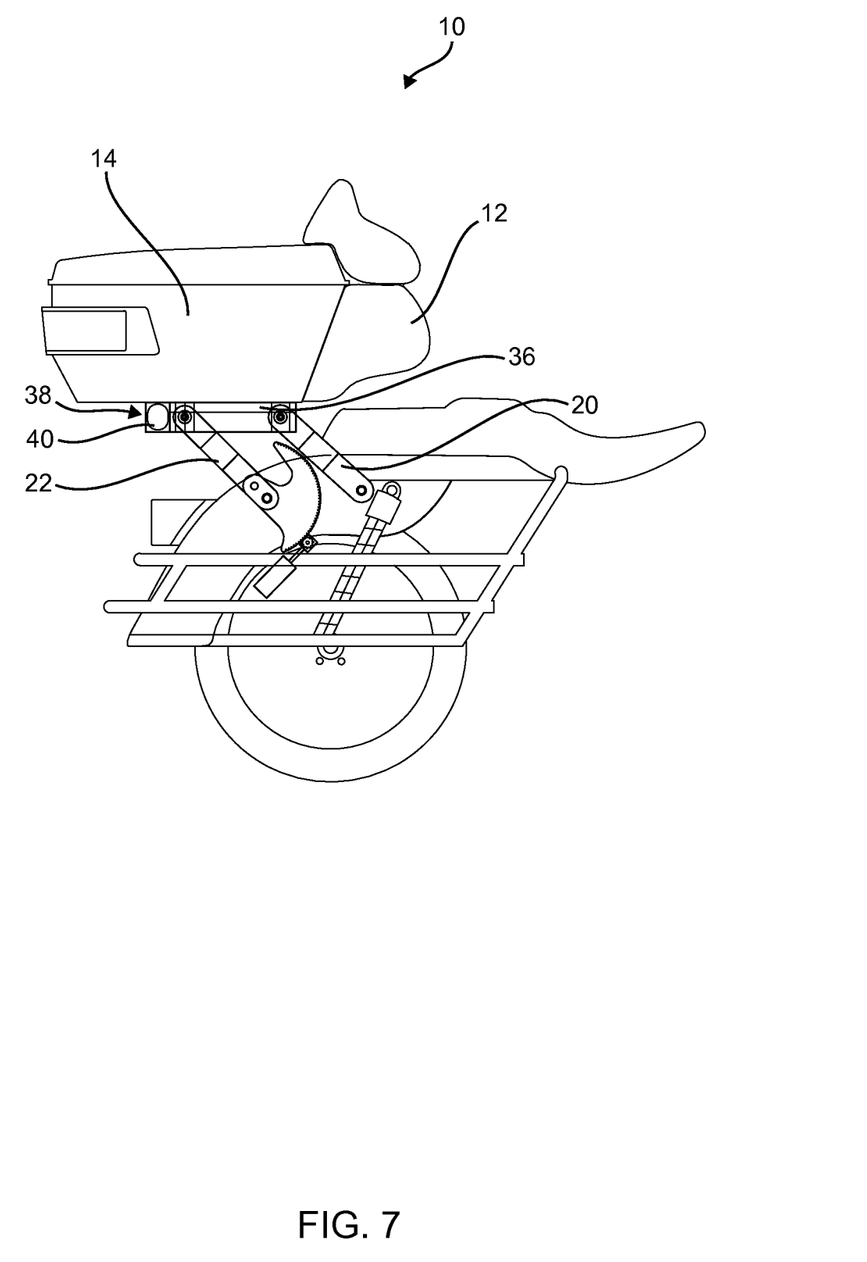
FIG. 7 is a right side view of the present invention, illustrating a backward movement of the right side pivoting means and the right sliding mechanism to move the tour-pack and the backrest in the backward direction relative to the slide deck housing to achieve the passenger supporting configuration.

The right side front pivoting arm 20 (FIG. 7), the right side rear pivoting arm 22 (FIG. 7), the left side front pivoting arm 62 (FIG. 3) and the left side rear pivoting arm 64 (FIG. 3) pivotally move in the backward direction to move the slide deck housing 38, the tour-pack 14 and the backrest 12 in the backward direction. Similar to FIG. 5, this seating configuration also provides the backrest support to the at least one passenger of a larger size or stature. As shown in FIG. 7, the tour-pack 14 and the backrest 12 moves away from the slide deck housing 38 in the backward direction to provide proper backrest support to the at least one passenger.

Figure 8:
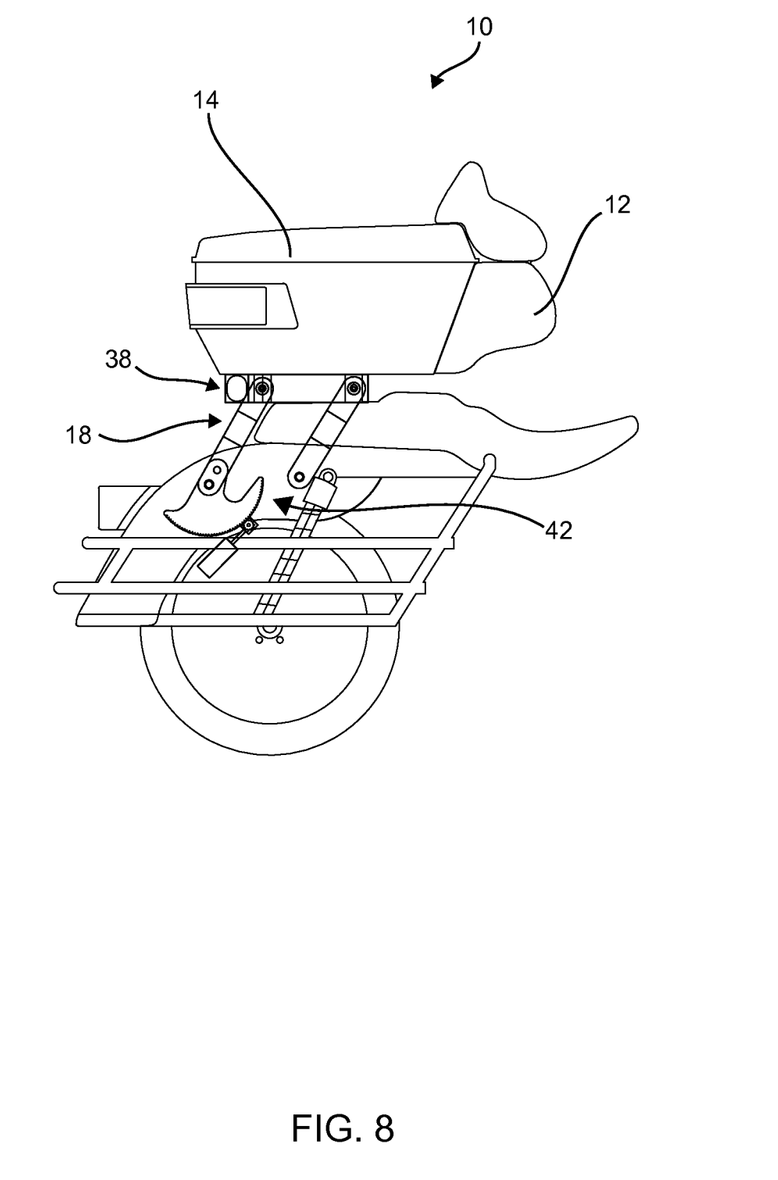
FIG. 8 is a right side view of the present invention, illustrating a forward movement of the right side pivoting means and the right sliding mechanism to move the tour-pack and the backrest in the forward direction to achieve the driver supporting configuration.

FIG. 8 illustrates the right side pivoting means 18 and the right sliding mechanism 42 adaptable to achieve the driver supporting configuration depicted in FIG. 5. When the driver presses the at least one of the plurality of control switches 74, the right sliding mechanism 42 moves the right side pivoting means 18 and the left sliding mechanism 60 (FIG. 3) moves the left side pivoting means 58 to move the slide deck housing 38, the tour-pack 14 and the backrest 12 in the forward direction. The driver adjusts the position of the tour-pack 14 and the backrest 12 by pressing the at least one of the plurality of control switches 74.

Figure 9:
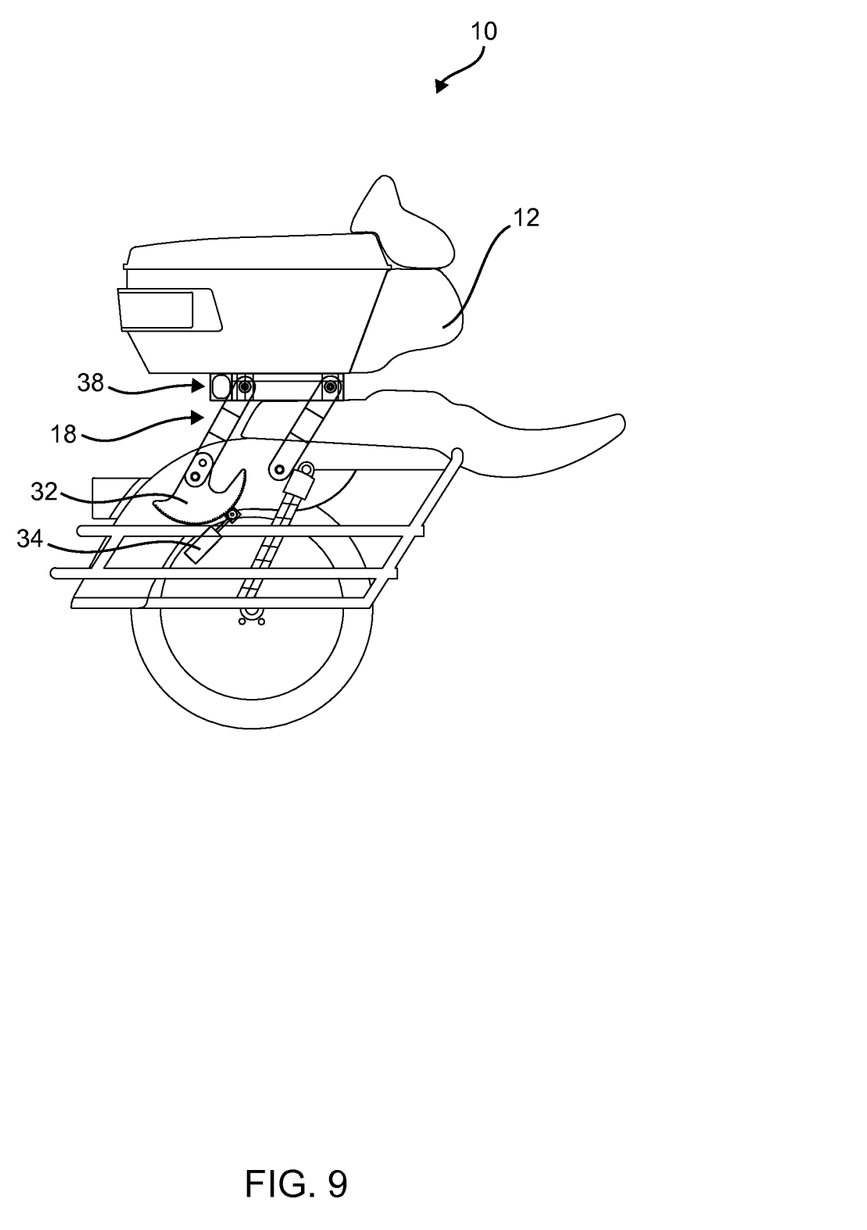
FIG. 9 is a right side view of the present invention, illustrating the forward movement of the right side pivoting means and the right sliding mechanism to provide the backrest support to the driver.

As shown in FIG. 9, when the at least one of the plurality of control switches 74 is pressed, the control interface 24 actuates the right pivoting motor 34 and the left pivoting motor 72 (FIG. 3) to drive the right pivoting gear 32 and the left pivoting gear 66 (FIG. 3) respectively to move the right side pivoting means 18 and the left side pivoting means 58 (FIG. 3) in the forward direction to provide the backrest support to the driver. In this seating configuration, the tour-pack 14 and the backrest 12 move in the backward direction relative to the slide deck housing 38 for comfortably supporting a driver having larger statute or size.

Figure 10:
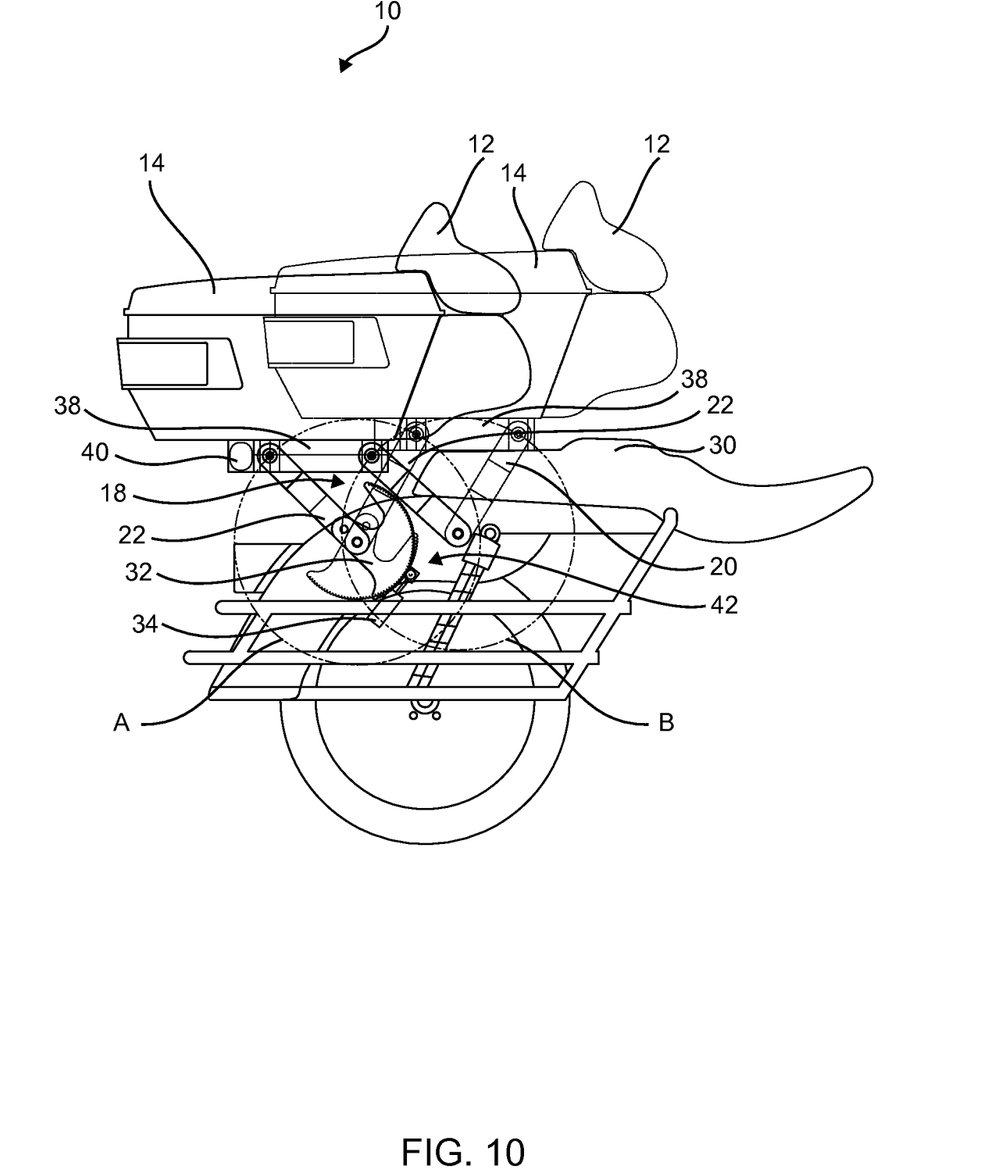
FIG. 10 is a right side view of the present invention, illustrating the forward and the backward movements of the tour-pack, the backrest and the slide deck housing.

With reference to FIG. 10, the forward and backward movement of the tour-pack 14, the backrest 12 and the slide deck housing 38 are illustrated from the right hand side. The seating configuration represented in solid lines illustrates the backward movement of the tour-pack and backrest assembly 10 to provide the backrest support to the at least one passenger and the seating configuration represented in phantom lines illustrates the forward movement of the tour-pack and backrest assembly 10 to provide the backrest support to the driver. The right side pivoting means 18 and the left side pivoting means 58 (not visible in this Figure) move in the backward direction to achieve the passenger supporting configuration. In the driver supporting configuration illustrated in dotted lines, the right side pivoting means 18 and the left side pivoting means 58 (not visible in this Figure) move in the forward direction to provide the backrest support to the driver. The tour-pack 14 and the backrest 12 moves away from the slide deck housing 38 in the backward direction to provide proper backrest support to the at least one passenger. The backward movement of the right side pivoting arms 20, 22 illustrated in the circle marked by the letter 'A' moves the tour-pack 14 and the backrest 12 in the backward direction. The forward movement of the right side pivoting arms 20, 22 illustrated in the circle marked by the letter 'B' moves the tour-pack 14 and the backrest 12 in the forward direction. In the driver supporting configuration illustrated in the dotted lines, the slide deck housing 38, the tour-pack 14 and the backrest 12 are in a raised position. This provides proper backrest support to the driver. The passenger supporting configuration and the driver supporting configuration is further adjustable to accommodate drivers and passengers of varying sizes. The right side pivoting means 18, the left side pivoting means 58 and the slide deck housing 38 are made of material selected from a group consisting of: metal, metal alloy, plastic and plastic composites.

An added advantage of the tour-pack and the backrest assembly 10 is that, in the passenger supporting configuration, the driver can easily mount and dismount the motorcycle 56 and eliminates the need for straightening their legs themselves through the seating area of the motorcycle 56. In use, a single driver (user) would operate the multi-configurable tour-pack and backrest assembly 10 as follows: the driver first mounts the motorcycle 56 with the multi-configurable tour-pack and backrest assembly 10 in the passenger supporting configuration, then actuates the right and the left pivoting means 18 and 58 by pressing a first switch 74 on the control interface 24 thus moving the multi-configurable tour-pack and backrest assembly 10 into the driver supporting configuration. Next, the user presses a second switch 74 on the control interface 24 to slide the tour-pack and backrest either forward or backward relative to the slide deck housing 38 until the driver is provided seating with maximum support and comfort. Another advantage of the present embodiment is that the multi-configurable tour-pack and backrest assembly 10 in preferred embodiment attaches to the motorcycle 56 without requiring drilling of additional holes in the motorcycle 56 or without modifying the motorcycle 56. For example, the right side pivoting means 18 and the left side pivoting means 58 attach to the motorcycle 56 without the need for any holes to first be drilled in the motorcycle 56. In alternative embodiments of the present invention, the right and left pivoting means 18 and 58 may require drilling of additional holes in the motorcycle 56 without affecting the aesthetic appearance, reliability and strength of the motorcycle 56. Yet another advantage of the multi-configurable tour-pack and backrest assembly is that it is electrically adjustable without the use of tools, levers, or other manual techniques.

The driver and the at least one passenger would use the multi-configurable tour-pack and backrest assembly 10 as follows: If the tour-pack 14 and the backrest 12 were in the configuration to support the driver and the passenger, then both may mount the motorcycle in any order. If the tour-pack 14 and the backrest 12 were in the configuration to support just the driver, then the driver would mount the motorcycle, actuate the tour-pack 14 and the backrest 12 such that it pivots to the configuration to support the driver and the at least passenger, and then the passenger would mount the motorcycle 56. The driver may press the second switch 74 on the control interface 24 to slide the tour-pack 14 and the backrest 12 either forward or backward relative to the slide deck housing 38 in order to fit with the driver's precise size and shape and to provide maximize support and comfort.

In one preferred embodiment, the multi-configurable tour-pack and backrest assembly 10 includes a seat sensor (not shown) for the passenger seat 30. The seat sensor (not shown) detects the presence of the at least one passenger on the motorcycle 56. The seat sensor (not shown) avoids the accidental conversion from the passenger supporting configuration to the driver supporting configuration and thus prevents the pivoting action of the left and ride side pivoting means 18 and 58 that may push the passenger against the driver when the at least one passenger and the driver are seated on the motorcycle 56. Further, the tour-pack and backrest assembly 10 can be employed with a pendulum, tilts, or a gravity sensor to detect whether the motorcycle 56 is turning or not. If the motorcycle 56 is in the process of turning, all seating configurations are disabled. When the driver is driving in a substantially straight line or with little lateral acceleration, motion of the slide deck housing 38 along the slide deck rail 36 is allowed for comfort. In other alternative embodiments of the present invention, no seating configuration is allowed when the motorcycle 56 is in motion.

The above description includes right side components and left side components which are generally a mirror image of one another, but otherwise identical.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

I claim:

1. A multi-configurable tour-pack and backrest assembly for a motorcycle, comprising:
    a frame structure having a left frame portion and a right frame portion;
    a slide deck housing mounted on the frame structure;
    a slide deck rail slidably mounted on the slide deck housing;
    a tour-pack mounted on the slide deck rail;
    a backrest mounted on the slide deck rail, the backrest and the tour-pack slideably movable with the slide deck rail in a forward direction and in a backward direction to achieve a plurality of comfortable seating configurations for providing backrest support to a driver and at least one passenger;
    a slide deck motor attached to the slide deck housing;
    a left side pivoting means pivotally connected to the slide deck housing, wherein the left side pivoting means includes a left side front pivoting arm and a left side rear pivoting arm;
    a right side pivoting means pivotally connected to the slide deck housing, wherein the right side pivoting means includes a right side front pivoting arm and a right side rear pivoting arm;
    a left sliding mechanism connected to the left frame portion, wherein the left sliding mechanism comprises a left pivoting motor and a left pivoting gear mechanically coupled to the left pivoting motor, the left pivoting motor being adaptable to drive the left pivoting gear to pivotally move the left side pivoting means for moving the slide deck housing, the tour-pack and the backrest in the forward direction and in the backward direction;
    a right sliding mechanism connected to the right frame portion, wherein the right sliding mechanism comprises a right pivoting motor and a right pivoting gear mechanically coupled to the right pivoting motor, the right pivoting motor being adaptable to drive the right pivoting gear to pivotally move the right side pivoting means for moving the slide deck housing, the tour-pack and the backrest in the forward direction and in the backward direction; and
    a control interface having a plurality of control switches, at least one of the plurality of control switches being adaptable to actuate the slide deck motor and the left pivoting motor and the right pivoting motor to drive the left pivoting gear and the right pivoting gear respectively for moving the slide deck housing, the tour-pack and the backrest in the forward and in the backward direction for providing the backrest support to the at least one passenger and the driver; and whereby the control interface activates the left side pivoting means, the right side pivoting means, the left sliding mechanism, the right sliding mechanism and the slide deck motor to move the slide deck housing, the tour-pack and the backrest in the forward and in the backward direction for providing the backrest support to the driver and the at least one passenger.

2. The multi-configurable tour-pack and backrest assembly of claim 1 wherein the slide deck motor adjusts the movement of the backrest and the tour-pack in the forward and in the backward direction along the slide deck housing.

3. The multi-configurable tour-pack and backrest assembly of claim 1 wherein the slide deck housing comprises a left slide deck portion and a right slide deck portion.

4. The multi-configurable tour-pack and backrest assembly of claim 3 wherein the left side pivoting means is pivotally connected to the left slide deck portion.

5. The multi-configurable tour-pack and backrest assembly of claim 3 wherein the right side pivoting means is pivotally connected to the right slide deck portion.

6. The multi-configurable tour-pack and backrest assembly of claim 1 wherein the left pivoting gear is pivotally connected to the left side rear pivoting arm.

7. The multi-configurable tour-pack and backrest assembly of claim 1 wherein the right pivoting gear is pivotally connected to the right side rear pivoting arm.

8. The multi-configurable tour-pack and backrest assembly of claim 1 wherein the tour-pack and the backrest move relative to the slide deck housing.

9. The multi-configurable tour-pack and backrest assembly of claim 1 wherein the pivotal motion of the left side pivoting means causes the left side front pivoting arm and the left side rear pivoting arm to move the slide deck housing, the tour-pack and the backrest in the forward direction and in the backward direction.

10. The multi-configurable tour-pack and backrest assembly of claim 1 wherein the pivotal motion of the right side pivoting means causes the right side front pivoting arm and the right side rear pivoting arm to move the slide deck housing, the tour-pack and the backrest in the forward direction and in the backward direction.

11. The multi-configurable tour-pack and backrest assembly of claim 1 wherein the at least one of the plurality of control switches is associated with at least one of the plurality of comfortable seating configurations for providing the backrest support to the driver and the at least one passenger.

12. The multi-configurable tour-pack and backrest assembly of claim 1 wherein the control interface is operatively coupled to the left sliding mechanism and to the right sliding mechanism.

13. The multi-configurable tour-pack and backrest assembly of claim 1 wherein the slide deck housing, the tour-pack and the backrest are adaptable to move in a raised position for providing the backrest support to the driver.

14. The multi-configurable tour-pack and backrest assembly of claim 1 wherein the multi-configurable tour-pack and backrest assembly is adjustable while the driver and the at least one passenger are sitting on the motorcycle.

15. The multi-configurable tour-pack and backrest assembly of claim 1 wherein the left side pivoting means, the right side pivoting means and the slide deck housing are made of material selected from a group consisting of: metals, metal alloys, plastics and plastic composites.

16. A multi-configurable tour-pack and backrest assembly for a motorcycle, comprising:
a frame structure having a left frame portion and a right frame portion;
a slide deck housing mounted on the frame structure;
a slide deck rail slidably mounted on the slide deck housing;
a tour-pack mounted on the slide deck rail;
a backrest mounted on the slide deck rail, the backrest and the tour-pack slideably movable with the slide deck rail in a forward direction and in a backward direction to achieve a plurality of comfortable seating configurations adaptable to provide backrest support to a driver and at least one passenger;
a slide deck motor attached to the slide deck housing, wherein the slide deck motor adjusts the movement of the tour-pack and the backrest in the forward and in the backward direction along the slide deck housing;
a left side pivoting means pivotally connected to the slide deck housing, wherein the left side pivoting means comprises a left side front pivoting arm and a left side rear pivoting arm;
a right side pivoting means pivotally connected to the slide deck housing, wherein the right side pivoting means comprises a right side front pivoting arm and a right side rear pivoting arm;
a left sliding mechanism connected to the left frame portion, wherein the left sliding mechanism comprises a left pivoting motor and a left pivoting gear mechanically coupled to the left pivoting motor, the left pivoting motor being adaptable to drive the left pivoting gear to pivotally move the left side pivoting means for moving the slide deck housing, the tour-pack and the backrest in the forward direction and in the backward direction;
a right sliding mechanism connected to the right frame portion, wherein the right sliding mechanism comprises a right pivoting motor and a right pivoting gear mechanically coupled to the right pivoting motor, the right pivoting motor being adaptable to drive the right pivoting gear to pivotally move the right side pivoting means for moving the slide deck housing, the tour-pack and the backrest in the forward direction and in the backward direction;
a control interface having a plurality of control switches, the control interface being operatively coupled to the left sliding mechanism and to the right sliding mechanism, at least one of the plurality of control switches being associated with at least one of the plurality of comfortable seating configurations for providing the backrest support to the driver and the at least one passenger, the at least one of the plurality of control switches being adaptable to actuate the slide deck motor and the left pivoting motor and the right pivoting motor to drive the left pivoting gear and the right pivoting gear respectively for moving, the tour-pack and the backrest in the forward and in the backward direction along the slide deck housing for providing the backrest support to the at least one passenger and the driver; and
whereby the control interface activates the left side pivoting means, the right side pivoting means, the left sliding mechanism, the right sliding mechanism and the slide deck motor to move the slide deck housing, the tour-pack and the backrest in the forward and in the backward direction for providing the backrest support to the driver and the at least one passenger.

17. The multi-configurable tour-pack and backrest assembly of claim 16 wherein the slide deck housing comprises a left slide deck portion and a right slide deck portion.

18. The multi-configurable tour-pack and backrest assembly of claim 17 wherein the left side pivoting means is pivotally connected to the left slide deck portion.

19. The multi-configurable tour-pack and backrest assembly of claim 17 wherein the right side pivoting means is pivotally connected to the right slide deck portion.

20. The multi-configurable tour-pack and backrest assembly of claim 17 wherein the left pivoting gear is pivotally connected to the left side rear pivoting arm.

21. The multi-configurable tour-pack and backrest assembly of claim 17 wherein the right pivoting gear is pivotally connected to the right side rear pivoting arm.

22. The multi-configurable tour-pack and backrest assembly of claim 17 wherein the tour-pack and the backrest move relative to the slide deck housing.

23. The multi-configurable tour-pack and backrest assembly of claim 17 wherein the pivotal motion of the left side pivoting means pivotally moves the left side front pivoting arm and the left side rear pivoting arm to move the slide deck housing, the tour-pack and the backrest in the forward direction and in the backward direction.

24. The multi-configurable tour-pack and backrest assembly of claim 17 wherein the pivotal motion of the right side pivoting means pivotally moves the right side front pivoting arm and the right side rear pivoting arm to move the slide deck housing, the tour-pack and the backrest in the forward direction and in the backward direction.

25. The multi-configurable tour-pack and backrest assembly of claim 17 wherein the control interface utilizes a plurality of relays and a plurality of wires to attach to the left sliding mechanism and with the right sliding mechanism.

26. The multi-configurable tour-pack and backrest assembly of claim 17 wherein the slide deck housing, the tour-pack and the backrest are adaptable to move in a raised position to provide the backrest support to the driver.

27. The multi-configurable tour-pack and backrest assembly of claim 17 wherein the multi-configurable tour-pack and backrest assembly is adjustable while the driver and the at least one passenger are sitting on the motorcycle.

28. The multi-configurable tour-pack and backrest assembly of claim 17 wherein the left side pivoting means, the right side pivoting means and the slide deck housing are made of material selected from a group consisting of: metals, metal alloys, plastics and plastic composites.

29. A multi-configurable tour-pack and backrest assembly for a motorcycle, comprising:
- a frame structure having a left frame portion and a right frame portion;
- a slide deck housing mounted on the frame structure, wherein the slide deck housing comprises a left slide deck portion and a right slide deck portion;
- a slide deck rail slidably mounted above the slide deck housing;
- a tour-pack mounted on the slide deck rail;
- a backrest mounted on the slide deck rail, the backrest and the tour-pack slideably movable with the slide deck rail in a forward direction and in a backward direction to achieve a plurality of comfortable seating configurations adaptable to provide backrest support to a driver and at least one passenger;
- a slide deck motor attached to the slide deck housing, wherein the slide deck motor adjusts the movement of the backrest and the tour-pack in the forward and in the backward direction along the slide deck housing;
- a left side pivoting means pivotally connected to the left slide deck portion, wherein the left side pivoting means comprises a left side front pivoting arm and a left side rear pivoting arm;
- a right side pivoting means pivotally connected to the right slide deck portion, wherein the right side pivoting means comprises a right side front pivoting arm and a right side rear pivoting arm;
- a left sliding mechanism connected to the left frame portion, wherein the left sliding mechanism comprises a left pivoting motor and a left pivoting gear pivotally connected to the left side rear pivoting arm and mechanically coupled to the left pivoting motor, the left pivoting motor being adaptable to drive the left pivoting gear to pivotally move the left side front pivoting arm and the left side rear pivoting arm for moving the slide deck housing, the tour-pack and the backrest in the forward direction and in the backward direction;
- a right sliding mechanism connected to the right frame portion, wherein the right sliding mechanism comprises a right pivoting motor and a right pivoting gear pivotally connected to the right side rear pivoting arm and mechanically coupled to the right pivoting motor, the right pivoting motor being adaptable to drive the right pivoting gear to pivotally move the right side front pivoting arm and the right side rear pivoting arm for moving the slide deck housing, the tour-pack and the backrest in the forward direction and in the backward direction; and
- a control interface having a plurality of control switches, the control interface being operatively coupled to the left sliding mechanism and to the right sliding mechanism, at least one of the plurality of control switches being associated with at least one of the plurality of comfortable seating configurations for providing the backrest support to the driver and the at least one passenger, the at least one of the plurality of control switches being adaptable to actuate the slide deck motor and the left pivoting motor and the right pivoting motor to drive the left pivoting gear and the right pivoting gear respectively to move the slide deck housing, the tour-pack and the backrest in the forward and in the backward direction for providing the backrest support to the at least one passenger and the driver;
- whereby the control interface activates the left side pivoting means, the right side pivoting means, the left sliding mechanism, the right sliding mechanism and the slide deck motor to move the slide deck housing, the tour-pack and the backrest in the forward and in the backward direction for providing the backrest support to the driver and the at least one passenger.

30. The multi-configurable tour-pack and backrest assembly of claim 29 wherein the slide deck housing, the tour-pack and the backrest are adaptable to move in a raised position to provide the backrest support to the driver.

31. The multi-configurable tour-pack and backrest assembly of claim 29 wherein the tour-pack and the backrest move relative to the slide deck housing.

32. The multi-configurable tour-pack and backrest assembly of claim 29 wherein the control interface utilizes a plurality of relays and a plurality of wires to attach to the left sliding mechanism and with the right sliding mechanism.

33. The multi-configurable tour-pack and backrest assembly of claim 29 wherein the multi-configurable tour-pack and backrest assembly is adjustable while the driver and the at least one passenger are sitting on the motorcycle.

34. The multi-configurable tour-pack and backrest assembly of claim 29 wherein the left side pivoting means, the right side pivoting means and the slide deck housing are made of material selected from a group consisting of: metals, metal alloys, plastics and plastic composites.

* * * * *